United States Patent
Jiang (10) Patent No.: US 8,259,750 B2
(45) Date of Patent: Sep. 4, 2012

(54) METHOD AND DEVICE FOR MAPPING ETHERNET CODE BLOCKS TO OTN FOR TRANSMISSION

(75) Inventor: Zhangzhen Jiang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 374 days.

(21) Appl. No.: 12/620,938

(22) Filed: Nov. 18, 2009

(65) Prior Publication Data
US 2010/0061725 A1 Mar. 11, 2010

Related U.S. Application Data

(63) Continuation of application No. PCT/CN2008/071553, filed on Jul. 4, 2008.

(30) Foreign Application Priority Data

Jul. 10, 2007 (CN) .......................... 2007 1 0137702

(51) Int. Cl.
*H04J 3/22* (2006.01)

(52) U.S. Cl. .................. 370/466; 370/535; 370/474

(58) Field of Classification Search .............. 370/466, 370/535, 474, 539, 401, 537; 398/154
See application file for complete search history.

(56) References Cited

U.S. PATENT DOCUMENTS

| | | | |
|---|---|---|---|
| 5,758,282 A | 5/1998 | Yamashina et al. | |
| 7,286,487 B2 * | 10/2007 | Perkins et al. | 370/253 |
| 2004/0156325 A1 | 8/2004 | Perkins et al. | |
| 2004/0202198 A1 | 10/2004 | Walker et al. | |
| 2006/0233194 A1 | 10/2006 | Loprieno | |

FOREIGN PATENT DOCUMENTS

| | | |
|---|---|---|
| CN | 1681258 A | 10/2005 |
| CN | 1791075 A | 6/2006 |

OTHER PUBLICATIONS

1st Office Action in corresponding Chinese Application No. 200710118545.2 (Apr. 14, 2010).

(Continued)

*Primary Examiner* — Chandrahas Patel
(74) *Attorney, Agent, or Firm* — Leydig, Voit & Mayer, Ltd.

(57) ABSTRACT

A method and a device for mapping Ethernet code blocks to an optical transport network (OTN) for transmission are provided. In the method, 10G Ethernet code blocks are mapped to an OTN frame corresponding to an optical channel payload unit 2 (OPU2) as a bit stream within a justification range according to an asynchronous bit-stream mapping manner, an identifier for indicating the asynchronous bit-stream mapping manner is set at an overhead (OH) portion of the OTN frame, an offset of a certain code block in the bit stream relative to a certain position of the OTN frame is recorded, and an indicator for indicating the offset position is set. Thus, specific solutions for mapping 10G Ethernet code blocks having an encoding rate lower than a minimum payload bandwidth of the OPU2 to the OTN for transmission is provided without changing the mature OTN architecture.

16 Claims, 6 Drawing Sheets

OTHER PUBLICATIONS

Extended European Search Report in corresponding European Application No. 08783688.8 (Jul. 29, 2010).

Written Opinion of the International Searching Authority in corresponding PCT Application No. PCT/CN2008/071553 (Oct. 23, 2008).

"Series G, Supplement 43—Transport of IEEE 10G Base-R in Optical Transport Networks (OTN)," Series G: Transmission Systems and Media, Digital Systems and Networks, Nov. 2006, International Telecommunication Union, Geneva, Switzerland.

"Com15-D313-E—Impact of stuffing bytes over GbE asynchronous aggregation in transparent mapping of 10G-Ethernet LANPHY over OTN," Study Period 2005-2008, May 16-27, 2005, International Telecommunication Union, Geneva, Switzerland.

* cited by examiner

A plurality of 10G Ethernet code blocks having an encoding rate smaller than a payload rate of an OPU2 is mapped to an OTN frame corresponding to the OPU2 as a bit stream within a justification range according to an asynchronous bit-stream mapping manner, an identifier for indicating the asynchronous bit-stream mapping manner is allocated in a PSI of the OTN frame, an offset of a certain code block in the bit stream relative to a certain position of the OTN frame is recorded, and an indicator for indicating the offset position is set ⸺ S301

The OTN frame is sent. When the OTN frame is sent, if it is found that data in the payload area of the OTN frame is not enough, justification control is performed on the OTN frame ⸺ S302

METHOD AND DEVICE FOR MAPPING ETHERNET CODE BLOCKS TO OTN FOR TRANSMISSION

CROSS-REFERENCE TO RELATED APPLICATIONS

This application is a continuation of International Application No. PCT/CN2008/071553, filed on Jul. 4, 2008, which claims priority to Chinese Patent Application No. 200710137702.4, filed on Jul. 10, 2007, both of which are hereby incorporated by reference in their entireties.

FIELD OF THE TECHNOLOGY

The present invention relates to the field of communication, and more particularly to a technology of mapping Ethernet code blocks to an optical transport network (OTN) for transmission.

BACKGROUND OF THE INVENTION

With the increasing bandwidth requirements caused by the increase in people's demand for voice, data, multimedia, and other services, the OTN has gradually become a core platform for bearer services of various operators. Transmission of 10 Gigabit (10G) Ethernet service data on the OTN is currently considered a hot topic.

Figure 1:
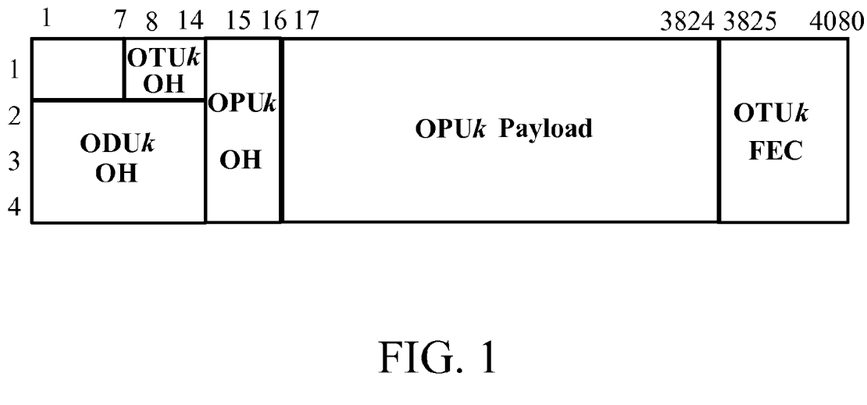
FIG. 1 is a schematic structural view of an OTN frame.

FIG. 1 is a schematic structural view of an OTN frame. As shown in FIG. 1, the OTN frame includes an optical channel payload unit-k (OPUk) payload, an optical channel transport unit-k (OTUk) forward error correction (FEC), and the following overhead (OH) portion caused by transmitting the payload:

OPUk OH; optical channel data unit-k (ODUk) OH; and OTUk OH.

Figure 2:
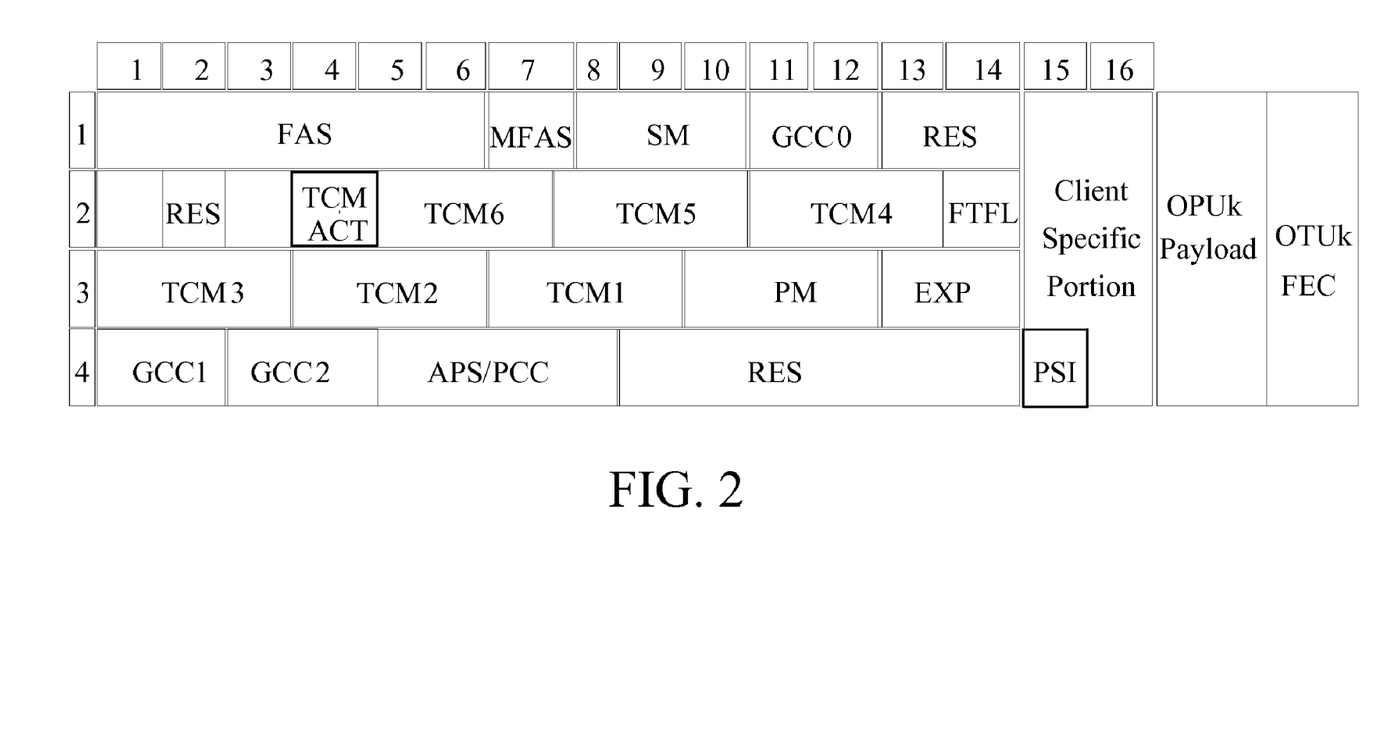
FIG. 2 is a schematic view of an OH structure of the OTN frame.

FIG. 2 is a schematic view of an OH structure of the OTN frame shown in FIG. 1. Referring to FIG. 2, a client specific portion is set at positions corresponding to $15^{th}$ and $16^{th}$ bytes. The portion contains a payload structure identifier (PSI) occupying one byte.

OPU types and capacity corresponding to the OPUk are as shown in Table 1.

TABLE 1

| OPU type | OPU Payload nominal bit rate | OPU Payload bit rate tolerance |
|---|---|---|
| OPU1 | 2 488 320 kbit/s | ±20 ppm |
| OPU2 | 238/237 × 9 953 280 kbit/s | |
| OPU3 | 238/236 × 39 813 120 kbit/s | |
| OPU1-Xv | X * 2 488 320 kbit/s | ±20 ppm |
| OPU2-Xv | X * 238/237 * 9 953 280 kbit/s | |
| OPU3-Xv | X * 238/236 * 39 813 120 kbit/s | |

NOTE
The nominal OPUk Payload rates are approximately: 2 488 320.000 kbit/s (OPU1 Payload), 9 995 276.962 kbit/s (OPU2 Payload) and 40 150 519.322 kbit/s (OPU3 Payload). The nominal OPUk-Xv Payload rates are approximately: X * 2 488 320.000 kbit/s (OPU1-Xv Payload), X * 9 995 276.962 kbit/s (OPU2-Xv Payload) and X * 40 150 519.322 kbit/s (OPU3-Xv Payload).

It can be seen that, the payload bandwidth of the OPU2 is 9.995276962 GBits/s.

In order to transmit 10G Ethernet code blocks (containing data and control codes), a payload bandwidth of at least 10 GBits/s is required. However, the payload bandwidth of the OPU2 of the OTN is 9.995276962 GBits/s, smaller than 10 GBits/s, and thus cannot meet the payload bandwidth requirements for transmission of 10G Ethernet frames in the OTN.

Therefore, some companies proposed to extend the payload bandwidth of the OPU by using a portion of unused OPU and ODU overheads.

It can be seen from FIG. 2 that, nine Reserve (RES) bytes, namely, the first three RES bytes in the second row and six RES bytes in the fourth row in FIG. 2, may be used for bearing the load. Comparing FIG. 1 with FIG. 2, it can be seen that a portion in FIG. 2 corresponding to the $OPU_k$ OH in FIG. 1 includes a client specific portion and a PSI, and occupies eight bytes, in which the PSI occupies one byte and cannot be used for bearing the load, and the other seven bytes may be used for bearing the load. In this way, the 16 bytes may be used for bearing the load, thereby extending the payload bandwidth of the OPU2.

After the payload bandwidth of the OPU2 is extended, the payload bandwidth of the OPU2 may be increased to (3808*4+16)/(3808*4)*9.995276962 GBits/s=10.005776202 GBits/s. The value is slightly higher than the rate of 10 GBits/s. Currently, 10G Ethernet signals are generally encoded through a 64B/66B encoding scheme, and the linear rate obtained after encoding is (66/64)*10 GBits/s=10.3125 GBits/s, which is still larger than the extended payload bandwidth of the OPU2. It can be seen that, the payload bandwidth requirements for transmission of 10G Ethernet standard MAC frames in the OTN cannot be met, even if the 64B/66B encoding scheme is used, and the encoding rate of 10G Ethernet code blocks needs to be reduced to be lower than the minimum payload bandwidth of the OPU2.

Although the payload bandwidth requirements for transmission of the 10G Ethernet code blocks in the OTN can be met after the encoding rate of the 10G Ethernet code blocks is reduced to be smaller than the minimum payload bandwidth of the OPU2, no specific solution for mapping the 10G Ethernet code blocks to the OTN for transmission is provided currently.

SUMMARY OF THE INVENTION

Accordingly, the present invention is directed to a method and a device for mapping Ethernet code blocks to an OTN for transmission, so as to provide specific solutions for mapping 10G Ethernet code blocks having an encoding rate lower than a minimum payload bandwidth of an OPU2 to the OTN for transmission without changing the mature OTN architecture.

The present invention is realized through the following technical solutions.

In an embodiment, the present invention provides a method for mapping Ethernet code blocks to an OTN for transmission, which includes the following steps.

The a plurality of 10G Ethernet code blocks are mapped to an OTN frame corresponding to an OPU2 as a bit stream within a justification range according to an asynchronous bit-stream mapping manner, an identifier for indicating the asynchronous bit-stream mapping manner is set at an OH portion of the OTN frame, an offset of a certain code block in the bit stream relative to a certain position of the OTN frame is recorded, and an indicator for indicating the offset position is set.

The obtained OTN frame is mapped the OPU2 of the OTN, and the OTN frame is then sent out.

In an embodiment, the present invention further provides a sending device, which includes a mapping unit and a transmission unit.

The mapping unit is adapted to map 10G Ethernet code blocks to an OTN frame corresponding to an OPU2 as a bit stream within a justification range according to an asynchronous bit-stream mapping manner, set an identifier for indicating the asynchronous bit-stream mapping manner at an OH portion of the OTN frame, record an offset of a certain code block in the bit stream relative to a certain position of the OTN frame, and set an indicator for indicating the offset position.

The transmission unit is adapted to map the obtained OTN frame to the OPU2 of the OTN, and send the OTN frame.

In an embodiment, the present invention further provides a method for mapping Ethernet code blocks to an OTN for transmission, which includes the following steps.

A received OTN frame is decoded to obtain an indicator for indicating an offset position of a code block and an identifier for indicating a mapping manner, a position of the code block in the OTN frame is located according to the indicator for indicating the offset position of the code block, positions of other code blocks are calculated according to a size of the code block, and it is acquired that the mapping manner for mapping 10G Ethernet code blocks to an OTN frame corresponding to an OPU2 is an asynchronous stream mapping manner according to the identifier for indicating the mapping manner.

The 10G Ethernet code blocks are decoded at corresponding positions according to the asynchronous stream mapping manner.

In an embodiment, the present invention further provides a receiving device, which includes an information acquisition unit and a decoding unit.

The information acquisition unit is adapted to decode a received OTN frame to obtain an indicator for indicating an offset position of a code block and an identifier for indicating a mapping manner, locate a position of the code block in the OTN frame according to the indicator for indicating the offset position of the code block, calculate positions of other code blocks in the OTN frame according to a size of the code block, and acquire that a mapping manner for mapping 10G Ethernet code blocks to an OTN frame corresponding to an OPU2 is an asynchronous stream mapping manner according to the identifier for indicating the mapping manner.

The decoding unit is adapted to decode the 10G Ethernet code blocks at corresponding positions according to the asynchronous stream mapping manner.

It can be seen from the technical solutions of the present invention that, 10G Ethernet code blocks are mapped to an OTN frame corresponding to an OPU2 as a bit stream within a justification range according to an asynchronous bit-stream mapping manner, an identifier for indicating the asynchronous bit-stream mapping manner is set at an OH portion of the OTN frame, an offset of a certain code block in the bit stream relative to a certain position of the OTN frame is recorded, and an indicator for indicating the offset position is set. Thus, the present invention provides specific solutions for mapping 10G Ethernet code blocks having an encoding rate lower than the minimum payload bandwidth of the OPU2 to the OTN for transmission without changing the mature OTN architecture.

DETAILED DESCRIPTION OF THE EMBODIMENTS

When 10G Ethernet service data is encoded through a 64*N/(64*N+1) encoding scheme, 10G Ethernet code blocks having an encoding rate lower than the minimum payload bandwidth of the OPU2 may be obtained. For example, if N=32, the encoding scheme is a 2048B/2049B encoding scheme, and 2049B code block streams having an encoding rate of 10.004882812500 GBits/s under a reference rate are obtained when 10G Ethernet service data is encoded through the encoding scheme. It can be seen that, the encoding rate is lower than the extended payload bandwidth of the OPU2, that is, 10.005776202 GBits/s. However, considering a clock offset of +100 ppm, the maximum encoding rate of the 2049B code block streams is 10.00588330078125 GBits/s, and considering a clock offset of −100 ppm, the minimum encoding rate of the 2049B code block streams is 10.00388232421875 GBits/s. Therefore, in this case, two aspects need to be considered.

1. Justification Control

Since the OPU2 rate increased by using the reserved overhead is higher than the Ethernet encoding rate under the reference rate, but is lower than the Ethernet rate when the clock offset is +100 ppm, positive and negative justification must be considered.

2. Frame Delimitation

Since the OPUk rate increased by using the reserved overhead is too close to the Ethernet encoding rate under the reference rate, GFP encapsulation cannot be used for framing, and an additional indication needs to be used for framing code block streams transmitted within a cycle.

Figure 3:
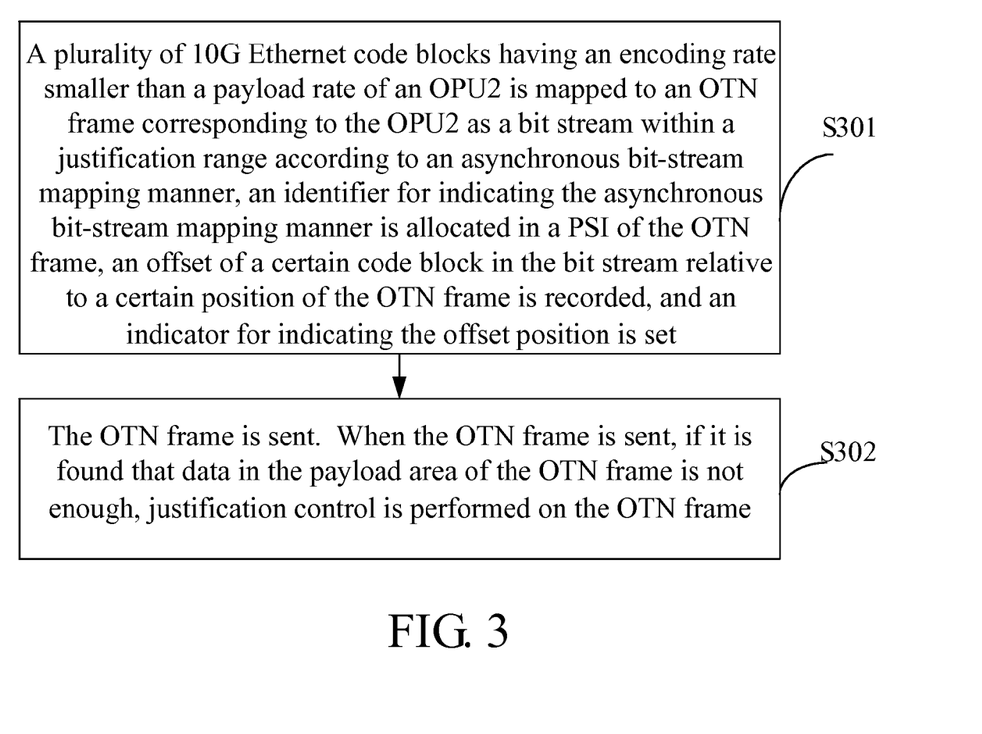
FIG. 3 is a flow chart according to a first embodiment of the present invention.

Based on the above consideration, in a first embodiment, the present invention provides a method for mapping Ethernet code blocks to an OTN for transmission, which uses an asynchronous bit-stream mapping method to map a plurality of 10G Ethernet code blocks to an OTN frame corresponding to an OPU2. Referring to FIG. 3, the method includes the following steps.

In step S301, a plurality of 10G Ethernet code blocks having an encoding rate lower than a payload rate of an OPU2 is mapped to an OTN frame corresponding to the OPU2 as a bit stream within a justification range according to an asynchronous bit-stream mapping manner, an identifier for indicating the asynchronous bit-stream mapping manner is allocated in a PSI of the OTN frame, an offset of a certain code block in the bit stream relative to a certain position of the OTN frame (for example, relative to the first byte or bit of the OTN frame) is recorded, and an indicator for indicating the offset position is set.

The plurality of 10G Ethernet code blocks is mapped to an OPUk payload portion in the OTN frame as the bit stream within the justification range according to the asynchronous bit-stream mapping manner, and space occupied by the first three RES bytes in the second row and six RES bytes in the fourth row in the OTN frame is used.

Figure 4:
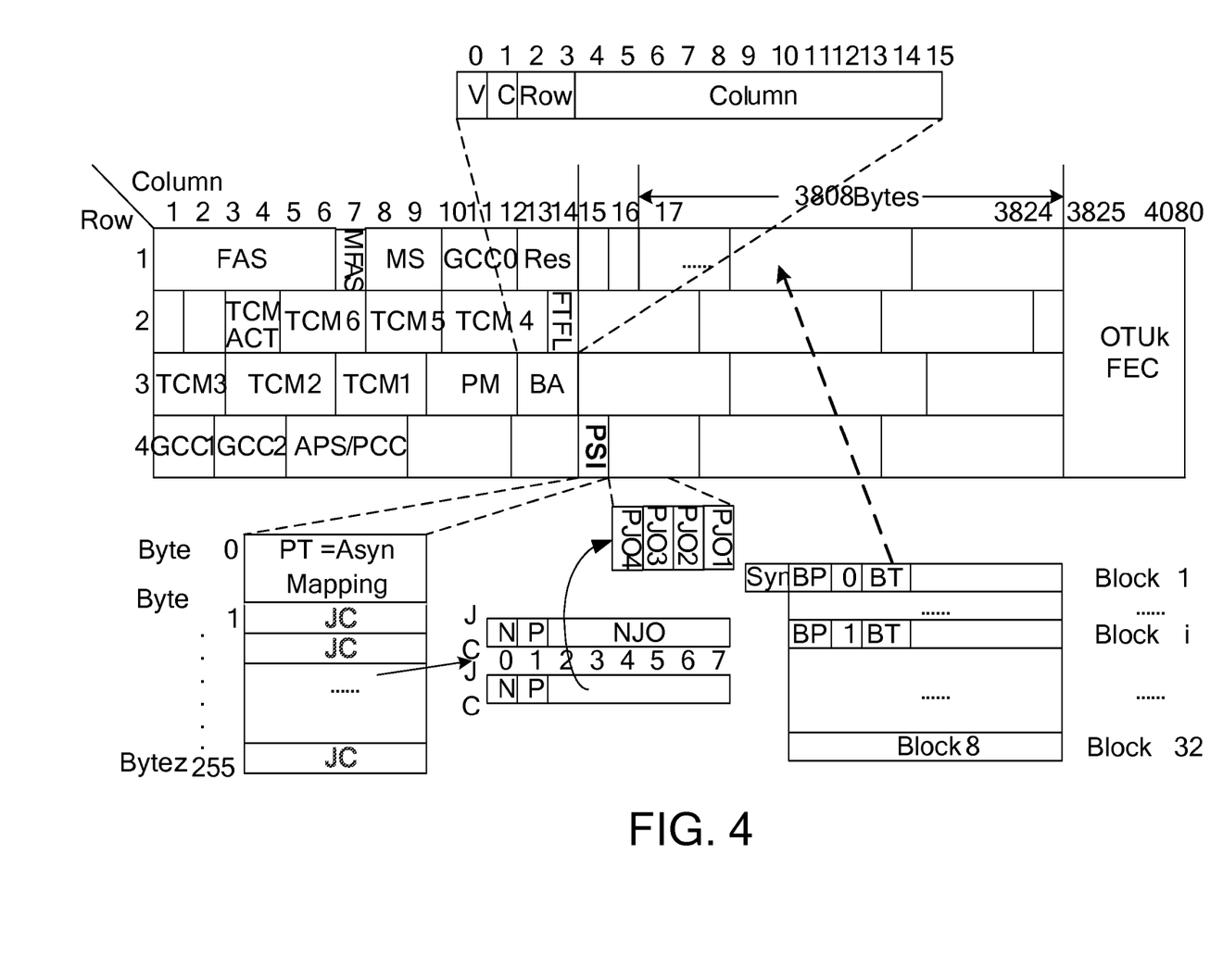
FIG. 4 shows an instance of a mapping process according to the first embodiment of the present invention.

Taking an instance of a mapping process shown in FIG. 4 as an example, a PT is allocated in the first byte of the PSI to indicate the asynchronous bit-stream mapping manner, that is, to indicate the features of the bit stream that is actually mapped.

A Block Align (BA) indicator is set at the 13th and 14th bytes in the third row of the ODU OH to indicate the offset position of the code block. The BA indicator includes the following elements.

1. A V indicator occupying one bit, for indicating whether 10G Ethernet code blocks transmitted in the current cycle contains valid data, with 1 indicating yes and 0 indicating no.

2. A C indicator occupying one bit, for indicating whether data before a frame delimiter in the 10G Ethernet code blocks transmitted in the current cycle is continuous data of a previous cycle, with C=0 representing that the valid data starts from the current cycle, and C=1 representing that the valid data exists before the current cycle, and the data before the frame delimiter in the current cycle needs to be decoded together with 10G Ethernet code blocks transmitted in the previous cycle.

3. A Row indicator occupying two bits and a Column indicator occupying twelve bits, for representing a position of the first frame delimiter on an 8-bit boundary in the 10G Ethernet code blocks transmitted in the current cycle.

The V and C indicators may also be omitted. For example, it may be unnecessary to set the V indicator if IDLE insertion is mandatory. Since the data is continuous, and a receiving end will surely decode the data portion before the position mark together with data of the previous cycle, it may also be unnecessary to set the C indicator.

The encoding scheme of the block position marks may vary, for example, the block position mark may be encoded according to a bit count, a byte count, row/column location, or the like.

In step S302, the OTN frame is sent. When the OTN frame is sent, if it is found that data in the payload area of the OTN frame is not enough, justification control is performed on the OTN frame.

It is feasible to insert an idle block containing no data into the OTN frame, and set a justification control (JC) identifier for identifying that the idle block is adapted for justification control in a client specific portion in the OPU OH of the OTN frame to indicate a justification control condition.

The idle block may be one or more 64B code blocks, or one or more other code blocks.

Still taking the instance of the mapping process shown in FIG. 4 as an example, it can be seen that, a JC indicator is set at the $1^{st}$ to $255^{th}$ bytes in the PSI of the OTN frame to indicate the justification control condition. The JC indicator includes the following elements.

A negative justification indication N occupying one bit, for indicating whether negative justification is performed on the OTN frame, with N=1 representing that negative justification is required, and N=0 representing that negative justification is not required;

A positive justification indication P occupying one bit, for indicating whether positive justification is performed on the OTN frame, with P=1 representing that positive justification is required, and P=0 representing that positive justification is not required;

Here, N and P cannot be 1 at the same time;

A negative justification opportunity overhead indication NJO occupying six bytes, for representing a negative justification opportunity overhead; and A positive justification opportunity overhead indication PJO occupying four bytes, for representing a positive justification opportunity overhead;

In 256 multiframe cycles, the first cycle PSI represents PT, which cannot be adjusted.

In this embodiment, the offset position of the code block is located by setting the BA indicator at the $13^{th}$ and $14^{th}$ bytes in the third row of the OPU OH; however, the present invention is not limited thereto, and the offset position of the code block may also be located by using other positions.

In addition, the position of the JC indication may vary, and the justification opportunity space, that is, the position for setting the idle block, may also vary.

Corresponding to the method according to the first embodiment of the present invention, in the first embodiment, the present invention further provides a sending device, which includes a mapping unit and a transmission unit. The mapping unit further includes a first mapping subunit. The sending device may further include a justification unit.

The mapping unit is adapted to map a plurality of 10G Ethernet code blocks having an encoding rate lower than a payload rate of an OPU2 to an OTN frame corresponding to the OPU2 as a bit stream within a justification range according to an asynchronous bit-stream mapping manner, allocate an identifier for indicating the asynchronous bit-stream mapping manner in a PSI of the OTN frame, record an offset of a certain code block in the bit stream relative to a certain position of the OTN frame (for example, relative to the first byte or bit of the OTN frame), and set an indicator for indicating the offset position. The specific implementation is as follows.

The first mapping subunit in the mapping unit maps the plurality of 10G Ethernet code blocks to an OPUk payload portion in the OTN frame as the bit stream within the justification range according to the asynchronous bit-stream mapping manner, and uses space occupied by the first three RES bytes in the second row and six RES bytes in the fourth row in the OTN frame. A PT is allocated in the first byte of the PSI to indicate the asynchronous bit-stream mapping manner, that is, to indicate the features of the bit stream that is actually mapped. A BA indicator is set at the $13^{th}$ and $14^{th}$ bytes in the third row of the ODU OH to indicate the offset position of the code block. The BA includes a Row indicator and a Column indicator for representing a position of the first frame delimiter on an 8-bit boundary in 10G Ethernet code blocks transmitted in the current cycle. The BA indicator may further include a V indicator for indicating whether the 10G Ethernet code blocks transmitted in the current cycle contain valid data, and/or a C indicator for indicating whether data before the frame delimiter in the 10G Ethernet code blocks transmitted in the current cycle is continuous data of a previous cycle.

The transmission unit is adapted to map the obtained OTN frame to the OPU2 of the OTN, and send the OTN frame.

The justification unit is adapted to perform justification control on the OTN frame by using an idle block if it is found that data in a payload area of the OTN frame is not enough when the OTN frame is sent, and set a corresponding JC identifier at the OH portion of the OTN frame to indicate that the idle block is adapted for justification control. The specific implementation is similar to the related description in the above method embodiment, so the details will not be described herein again.

Corresponding to the method for mapping a plurality of 10G Ethernet code blocks to an OTN for transmission, in the first embodiment, the present invention further provides a corresponding receiving and processing process. The process is as follows.

The received OTN frame is decoded to obtain a BA indicator for indicating an offset position of a code block and a PT identifier for indicating a mapping manner.

A position of the code block in the OTN frame is located according to the BA indicator for indicating the offset position of the code block, positions of other code blocks in the OTN frame are calculated according to a size of the code block, and it is acquired according to the PT identifier for indicating the mapping manner that the mapping manner for mapping 10G Ethernet code blocks to an OTN frame corresponding to an OPU2 is an asynchronous stream mapping manner.

The 10G Ethernet code blocks at corresponding positions are decoded according to the asynchronous stream mapping manner.

In addition, a justification indicator JC may also be obtained in the decoding process. It is determined whether the current OTN frame contains an idle block for justification control according to the justification indicator JC, and the idle block is deleted after determining that the current OTN frame contains the idle block for justification control.

Corresponding to the receiving and processing process according to the first embodiment of the present invention, in the first embodiment, the present invention further provides a receiving and processing device, which includes an information acquisition unit and a decoding unit.

The information acquisition unit is adapted to decode a received OTN frame to obtain a BA indicator for indicating an offset position of a code block and a PT identifier for indicating a mapping manner, locate a position of the code block in the OTN frame according to the BA indicator for indicating the offset position of the code block, calculate positions of other code blocks in the OTN frame according to a size of the code block, and acquire that the mapping manner for mapping 10G Ethernet code blocks to an OTN frame corresponding to an OPU2 is an asynchronous stream mapping manner according to the PT identifier for indicating the mapping manner.

The decoding unit is adapted to decode the 10G Ethernet code blocks at corresponding positions according to the asynchronous stream mapping manner. The decoding unit is further adapted to determine whether an idle block is inserted into the OTN frame according to a corresponding JC identifier in the OTN frame, and delete the idle block after determining that the idle block is inserted.

In a second embodiment, the present invention provides another method for mapping Ethernet code blocks to an OTN for transmission, which is different from the first embodiment in the following aspect.

In the second embodiment, other OH portions in the OTN frame, such as GCC1/GCC2 in an ODU OH portion and a non-PT portion of a PSI in an OPU OH portion, are used for bearing the load.

In the second embodiment, since other OH portions in the OTN frame are used for bearing the load, the payload rate of the OPU2 is always higher than the encoding rate of 10G Ethernet, so the solution for performing justification control on the OTN frame is simpler than that in the first embodiment.

Figure 5:
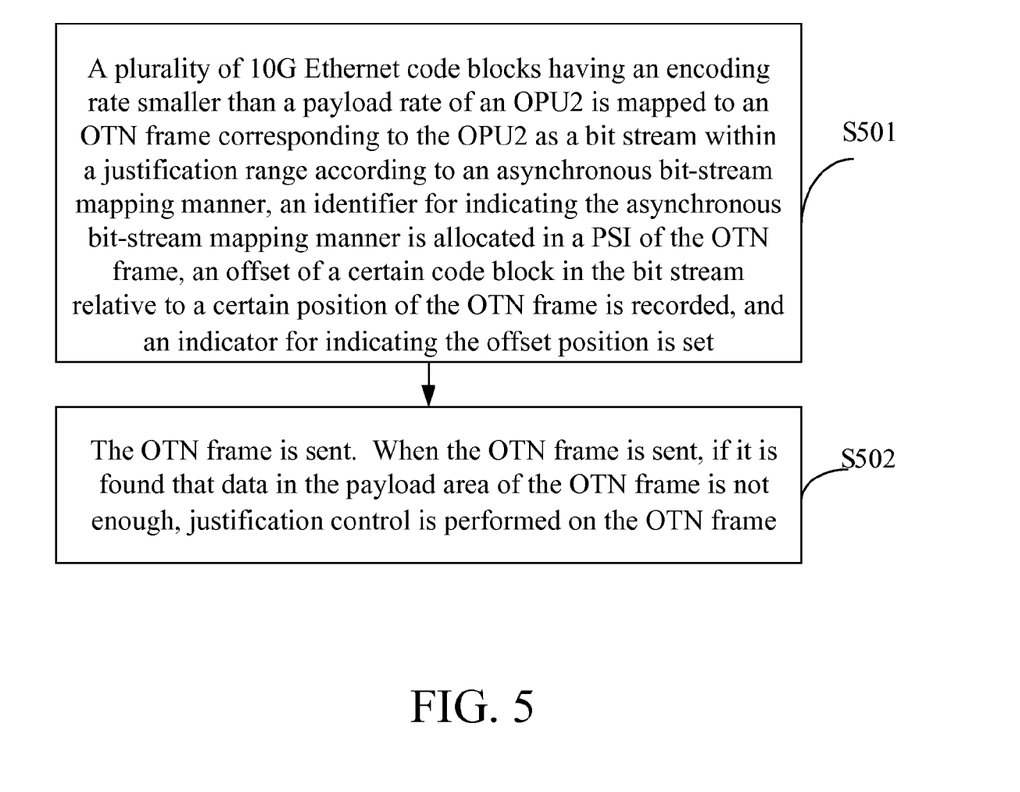
FIG. 5 is a flow chart according to a second embodiment of the present invention.

Referring FIG. 5, the method according to the second embodiment of the present invention includes the following steps.

In step S501, a plurality of 10G Ethernet code blocks having an encoding rate lower than a payload rate of an OPU2 is mapped to an OTN frame corresponding to the OPU2 as a bit stream within a justification range according to an asynchronous bit-stream mapping manner, an identifier for indicating the asynchronous bit-stream mapping manner is allocated in a PSI of the OTN frame, an offset of a certain code block in the bit stream relative to a certain position of the OTN frame (for example, relative to the first byte or bit of the OTN frame) is recorded, and an indicator for indicating the offset position is set.

In the mapping process, an OPUk payload portion in the OTN frame is used, and the first three RES bytes in the second row and six RES bytes in the fourth row in the OTN frame are used for bearing the load. In addition, GCC1/GCC2 in the ODU OH portion is also used for bearing the load, and/or the non-PT portion of the PSI in the OPU OH portion is used for bearing the load.

Figure 6:
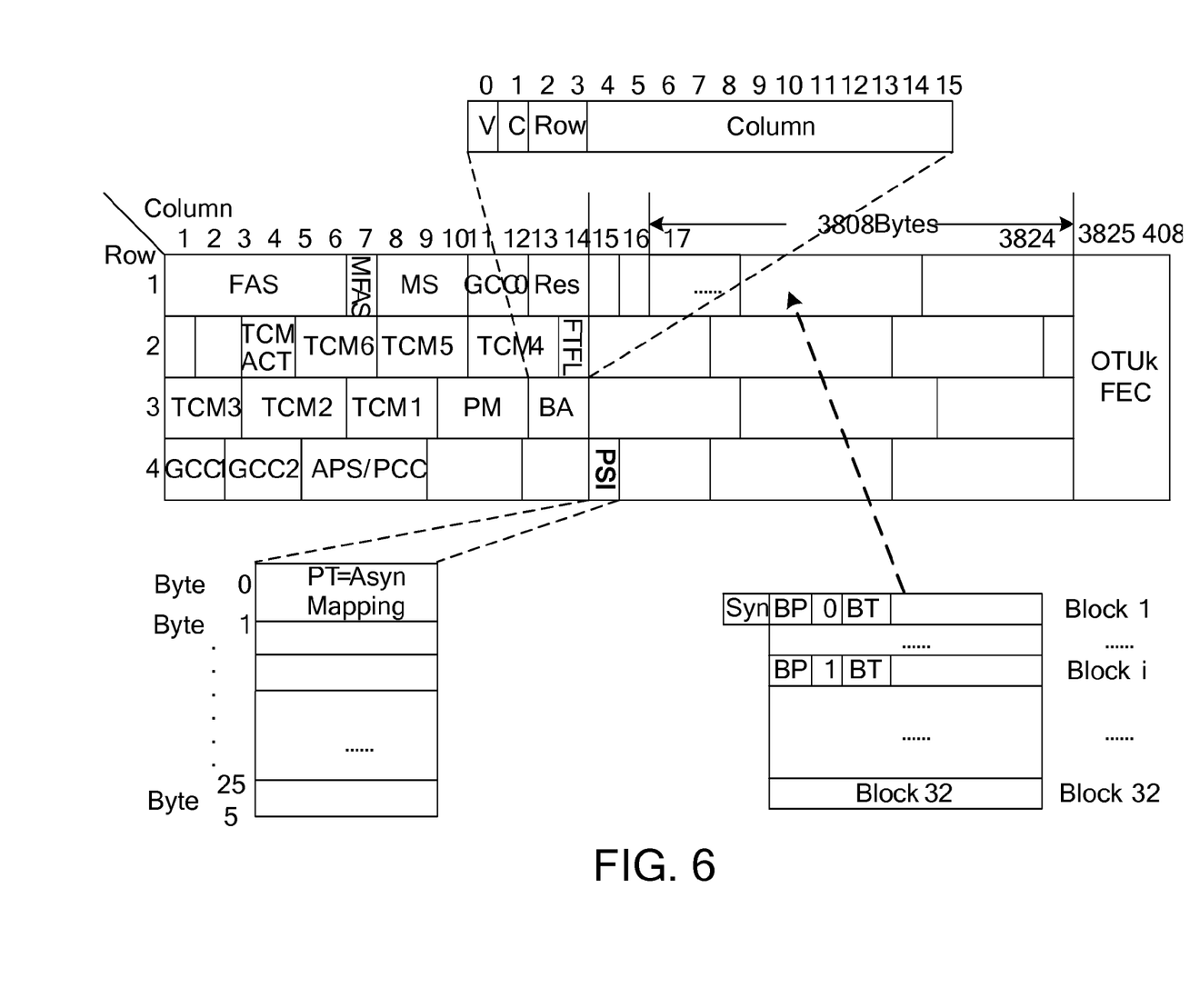
FIG. 6 shows an instance of a mapping process according to the second embodiment of the present invention.

Taking an instance of the mapping process shown in FIG. 6 as an example, a PT may be allocated in the first byte of the PSI to indicate the asynchronous bit-stream mapping manner, that is, to indicate the features of the bit stream that is actually mapped.

A BA indicator may be set at the $13^{th}$ and $14^{th}$ bytes in the third row of the OPU OH to indicate the offset position of the code block. The BA indicator includes the same elements as the BA indicator in the first embodiment of the present invention, so the details will not be described herein again.

In step S502, the OTN frame is sent. When the OTN frame is sent, if it is found that data in the payload area of the OTN frame is not enough, justification control is performed on the OTN frame.

It is feasible to insert an idle block containing no data into any portion for bearing the load in the OTN frame, and set a JC identifier for identifying that the idle block is adapted for justification control in a client specific portion in the OPU OH of the OTN frame to indicate a justification control condition.

The idle block may be one or more 64B 10G code blocks, or one or more other 10G code blocks.

Corresponding to the method according to the second embodiment of the present invention, in the second embodiment, the present invention further provides a sending device, which includes a mapping unit and a transmission unit. The mapping unit further includes a second mapping subunit. The sending device may further include a justification unit.

The mapping unit is adapted to map a plurality of 10G Ethernet code blocks having an encoding rate lower than a payload rate of an OPU2 to an OTN frame corresponding to the OPU2 as a bit stream within a justification range according to an asynchronous bit-stream mapping manner, allocate an identifier for indicating the asynchronous bit-stream mapping manner in a PSI of the OTN frame, record an offset of a certain code block in the bit stream relative to a certain position of the OTN frame (for example, relative to the first byte or bit of the OTN frame), and set an indicator for indicating the offset position. The specific implementation is as follows.

The second mapping subunit in the mapping unit maps the plurality of 10G Ethernet code blocks to an OPUk payload portion in the OTN frame as the bit stream within the justification range according to the asynchronous bit-stream mapping manner, and uses space occupied by the first three RES bytes in the second row and six RES bytes in the fourth row in the OTN frame. In addition, the plurality of 10G Ethernet code blocks is mapped to GCC1/GCC2 in an ODU OH portion in the OTN frame, and/or the plurality of 10G Ethernet code blocks is mapped to a non-PT portion of a PSI in an OPU OH portion in the OTN frame. A PT is allocated in Byte 0 of the PSI to indicate the asynchronous bit-stream mapping manner, that is, to indicate the features of the bit stream that is actually mapped. A BA indicator is set at the $13^{th}$ and $14^{th}$ bytes in the third row of the OPU OH to indicate the offset position of the code block. The BA includes a Row indicator and a Column indicator for representing a position of the first frame delimiter on an 8-bit boundary in 10G Ethernet code blocks transmitted in the current cycle. The BA indicator may further include a V indicator for indicating whether the 10G Ethernet code blocks transmitted in the current cycle contain valid data, and/or a C indicator for indicating whether data before the frame delimiter in the 10G Ethernet code blocks transmitted in the current cycle is continuous data of a previous cycle.

The transmission unit is adapted to map the obtained OTN frame to the OPU2 of the OTN, and send the OTN frame.

The justification unit is adapted to perform justification control on the OTN frame by using an idle block if it is found that data in a payload area of the OTN frame is not enough when the OTN frame is sent, and set a corresponding JC identifier at the OH portion of the OTN frame to indicate that the idle block is adapted for justification control. The specific implementation is similar to the related description in the above method embodiment, so the details will not be described herein again.

It can be seen from the technical solutions of the present invention that, 10G Ethernet code blocks are mapped to an OTN frame corresponding to an OPU2 as a bit stream within a justification range according to an asynchronous bit-stream mapping manner, an identifier for indicating the asynchronous bit-stream mapping manner is set at an OH portion of the OTN frame, an offset of a certain code block in the bit stream relative to a certain position of the OTN frame is recorded, and an indicator for indicating the offset position is set. Thus, the present invention provides specific solutions for mapping 10G Ethernet code blocks having an encoding rate lower than the minimum payload bandwidth of the OPU2 to the OTN for transmission without changing the mature OTN architecture.

It will be apparent to persons skilled in the art that various modifications and variations can be made to the present invention without departing from the scope or spirit of the invention. In view of the foregoing, it is intended that the present invention cover modifications and variations of this invention provided they fall within the scope of the following claims and their equivalents.

What is claimed is:

1. A method for mapping Ethernet code blocks to an optical transport network (OTN) for transmission, comprising:

mapping a plurality of 10 Gigabit (10G) Ethernet code blocks to an OTN frame corresponding to an optical channel payload unit 2 (OPU2) as a bit stream within a justification range according to an asynchronous bit-stream mapping manner;

setting an identifier for indicating the asynchronous bit-stream mapping manner at an overhead (OH) portion of the OTN frame;

recording an offset of a certain code block in the bit stream relative to a certain position of the OTN frame;

allocating a Block Align (BA) indicator in an optical channel data unit (ODU) OH portion of the OTN frame to indicate an offset position, wherein the BA indicator comprises a Row indicator and a Column indicator for representing a position of a first frame delimiter on an 8-bit boundary in the 10G Ethernet code blocks transmitted in a current cycle;

mapping the obtained OTN frame to the OPU2 of the OTN; and sending the OTN frame.

2. The method according to claim 1, wherein the mapping the plurality of the 10G Ethernet code blocks to the OTN frame corresponding to the OPU2 as the bit stream within the justification range according to the asynchronous bit-stream mapping manner comprises:

mapping the plurality of the 10G Ethernet code blocks to an optical channel payload unit, in order k (OPUk) payload portion in the OTN frame as the bit stream within the justification range according to the asynchronous bit-stream mapping manner, and using space occupied by a first three Reserve (RES) bytes in the second row and six RES bytes in the fourth row in the OTN frame.

3. The method according to claim 2, wherein the mapping the plurality of the 10G Ethernet code blocks to the OTN frame corresponding to the OPU2 as the bit stream within the justification range according to the asynchronous bit-stream mapping manner further comprises at least one of the group consisting of:

mapping the plurality of the 10G Ethernet code blocks to space occupied by GCC1/GCC2 in the ODU OH portion in the OTN frame as the bit stream within the justification range according to the asynchronous bit-stream mapping manner; and mapping the plurality of the 10G Ethernet code blocks to space occupied by a non-payload type (PT) portion of a payload structure identifier (PSI) in an OPU OH portion in the OTN frame as the bit stream within the justification range according to the asynchronous bit-stream mapping manner.

4. The method according to claim 1, wherein the setting the identifier for indicating the asynchronous bit-stream mapping manner at the OH portion of the OTN frame comprises:

allocating a PT identifier for indicating the asynchronous bit-stream mapping manner in a payload structure identifier (PSI) of an OPU OH portion of the OTN frame to indicate the asynchronous bit-stream mapping manner.

5. The method according to claim 1, wherein the BA indicator for indicating the offset position further comprises at least one of the group consisting of:

an indicator for indicating whether the 10G Ethernet code blocks transmitted in the current cycle contain valid data; and an indicator for indicating whether data before the frame delimiter in the 10G Ethernet code blocks transmitted in the current cycle is continuous data of a previous cycle.

6. The method according to claim 1, further comprising:

performing justification control on the OTN frame by using an idle block if it is found that data in a payload area of the OTN frame is not enough when the OTN frame is sent, and setting a corresponding justification control (JC) identifier at the OH portion of the OTN frame to indicate that the idle block is adapted for justification control.

7. The method according to claim 6, wherein the performing the justification control on the OTN frame by using the idle block, and setting the corresponding JC identifier at the OH portion of the OTN frame to indicate that the idle block is adapted for justification control comprises:

inserting the idle block containing no data into the OTN frame, and allocating the JC identifier in a payload structure identifier (PSI) of the OPU OH portion of the OTN frame to identify that the idle block is adapted for the justification control.

8. The method according to claim 7, wherein the JC identifier comprises at least one of the group consisting of:

a negative justification indicator N for indicating whether negative justification is performed on the OTN frame, and a negative justification opportunity overhead indication (NJO) for representing a negative justification opportunity overhead; and a positive justification indication P for indicating whether positive justification is performed on the OTN frame, and a positive justification opportunity overhead indication (PJO) for representing a positive justification opportunity overhead.

9. A method for mapping Ethernet code blocks to an optical transport network (OTN) for transmission, comprising:
- decoding a received OTN frame to obtain an indicator for indicating an offset position of a code block and an identifier for indicating a mapping manner;
- locating a position of the code block in the OTN frame according to the indicator for indicating the offset position of the code block;
- calculating positions of other code blocks according to a size of the code block;
- acquiring that the mapping manner for mapping 10 Gigabit (10G) Ethernet code blocks to an OTN frame corresponding to an optical channel payload unit 2 (OPU2) is an asynchronous stream mapping manner according to the identifier for indicating the mapping manner;
- decoding the 10G Ethernet code blocks at corresponding positions according to the asynchronous stream mapping manner;
- obtaining a justification indicator in the decoding process, determining whether the OTN frame contains an idle block for justification control according to the justification indicator; and
- deleting the idle block after determining that the OTN frame contains the idle block for the justification control.

10. A receiving and processing device, comprising:
- an information acquisition unit, configured to decode a received optical transport network (OTN) frame to obtain an indicator for indicating an offset position of a code block and an identifier for indicating a mapping manner, locate a position of the code block in the OTN frame according to the indicator for indicating the offset position of the code block, calculate positions of other code blocks in the OTN frame according to a size of the code block, and acquire that the mapping manner for mapping 10 Gigabit (10G) Ethernet code blocks to an OTN frame corresponding to an optical channel payload unit 2 (OPU2) is an asynchronous stream mapping manner according to the identifier for indicating the mapping manner; and
- a decoding unit, configured to decode the 10G Ethernet code blocks at corresponding positions according to the asynchronous stream mapping manner, determine whether an idle block is inserted into the OTN frame according to a corresponding justification control (7C) identifier in the OTN frame, and delete the idle block after determining that the idle block is inserted.

11. A sending device, comprising:
- a mapping unit, configured to map 10 Gigabit (10G) Ethernet code blocks to an optical transport network (OTN) frame corresponding to an optical channel payload unit 2 (OPU2) as a bit stream within a justification range according to an asynchronous bit-stream mapping manner, set an identifier for indicating the asynchronous bit-stream mapping manner at an overhead (OH) portion of the OTN frame, record an offset of a certain code block in the bit stream relative to a position of the OTN frame, and set an indicator for indicating an offset position, wherein a Block Align (BA) indicator is set in an optical channel data unit (ODU) OH portion of the OTN frame to indicate the offset position of the code block, the BA indicator comprises a Row indicator and a Column indicator for representing a position of the first frame delimiter on an 8-bit boundary in the 10G Ethernet code blocks transmitted in a current cycle; and
- a transmission unit, configured to map the obtained OTN frame to the OPU2 of the OTN, and send the OTN frame.

12. The device according to claim 11, wherein the mapping unit comprises at least one of the group consisting of:
- a first mapping subunit, configured to map the plurality of the 10G Ethernet code blocks to space occupied by GCC1/GCC2 in the ODU OH portion in the OTN frame as the bit stream within the justification range according to the asynchronous bit-stream mapping manner, set the identifier for indicating the asynchronous bit-stream mapping manner at the OH portion of the OTN frame, record the offset of the certain code block in the bit stream relative to the certain position of the OTN frame, and set the indicator for indicating the offset position; and
- a second mapping subunit, configured to map the plurality of the 10G Ethernet code blocks to space occupied by a non-payload type (PT) portion of a payload structure identifier (PSI) in an OPU OH portion in the OTN frame as the bit stream within the justification range according to the asynchronous bit-stream mapping manner, set the identifier for indicating the asynchronous bit-stream mapping manner at the OH portion of the OTN frame, record the offset of the certain code block in the bit stream relative to the certain position of the OTN frame, and set the indicator for indicating the offset position.

13. The device according to claim 11, further comprising:
- a justification unit, configured to perform justification control on the OTN frame by using an idle block if it is found that data in a payload area of the OTN frame is not enough when the OTN frame is sent, and set a corresponding justification control (JC) identifier at the OH portion of the OTN frame to indicate that the idle block is adapted for justification control.

14. A method for mapping Ethernet code blocks to an optical transport network (OTN) for transmission, comprising:
- mapping a plurality of 10 Gigabit (10G) Ethernet code blocks to an OTN frame corresponding to an optical channel payload unit 2 (OPU2) as a bit stream within a justification range according to an asynchronous bit-stream mapping manner;
- setting an identifier for indicating the asynchronous bit-stream mapping manner at an overhead (OH) portion of the OTN frame;
- recording an offset of a certain code block in the bit stream relative to a certain position of the OTN frame;
- setting an indicator for indicating the offset position;
- mapping the obtained OTN frame to the OPU2 of the OTN;
- performing justification control on the OTN frame by using an idle block if it is found that data in a payload area of the OTN frame is not enough when the OTN frame is sent;
- setting a corresponding justification control (JC) identifier at the OH portion of the OTN frame to indicate that the idle block is adapted for justification control; and
- sending the OTN frame.

15. The method according to claim 14, wherein the performing the justification control on the OTN frame by using the idle block, and setting the corresponding JC identifier at the OH portion of the OTN frame to indicate that the idle block is adapted for justification control comprises:
- inserting the idle block containing no data into the OTN frame, and allocating the JC identifier in a payload structure identifier (PSI) of the OPU OH portion of the OTN frame to identify that the idle block is adapted for justification control.

16. The method according to claim 15, wherein the JC identifier comprises at least one of the group consisting of:
a negative justification indicator N for indicating whether negative justification is performed on the OTN frame, and a negative justification opportunity overhead indication (NJO) for representing a negative justification opportunity overhead; and
a positive justification indication P for indicating whether positive justification is performed on the OTN frame, and a positive justification opportunity overhead indication (PJO) for representing a positive justification opportunity overhead.

* * * * *

UNITED STATES PATENT AND TRADEMARK OFFICE
CERTIFICATE OF CORRECTION

| | | |
|---|---|---|
| PATENT NO. | : 8,259,750 B2 | Page 1 of 1 |
| APPLICATION NO. | : 12/620938 | |
| DATED | : September 4, 2012 | |
| INVENTOR(S) | : Zhangzhen Jiang | |

It is certified that error appears in the above-identified patent and that said Letters Patent is hereby corrected as shown below:

Col. 11, line 45, "(7C)" should read -- (JC) --.

Signed and Sealed this
Twenty-seventh Day of November, 2012

David J. Kappos
*Director of the United States Patent and Trademark Office*